US012162585B2

(12) United States Patent
Loos et al.

(10) Patent No.: US 12,162,585 B2
(45) Date of Patent: Dec. 10, 2024

(54) PASSIVE ROTOR PITCH CONTROL SYSTEM

(71) Applicants: Eric Stephen Loos, Glastonbury, CT (US); Jonathan Lee Fleming, Blacksburg, VA (US); Judith Marie Gallman, Torrance, CA (US); Robert Francis Talbert, Clinton, UT (US)

(72) Inventors: Eric Stephen Loos, Glastonbury, CT (US); Jonathan Lee Fleming, Blacksburg, VA (US); Judith Marie Gallman, Torrance, CA (US); Robert Francis Talbert, Clinton, UT (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 18/185,628

(22) Filed: Mar. 17, 2023

(65) Prior Publication Data
US 2024/0308646 A1 Sep. 19, 2024

(51) Int. Cl.
*B64C 11/34* (2006.01)
*B64C 29/02* (2006.01)

(52) U.S. Cl.
CPC ............ *B64C 11/346* (2013.01); *B64C 29/02* (2013.01)

(58) Field of Classification Search
CPC ....... B64C 11/346; B64C 29/02; B64C 11/30; B64C 11/34
See application file for complete search history.

(56) References Cited

U.S. PATENT DOCUMENTS

| 2,722,985 | A | | 11/1955 | Biermann | |
|---|---|---|---|---|---|
| 2,774,433 | A | * | 12/1956 | Corum | B64C 11/346 416/49 |
| RE24,530 | E | * | 9/1958 | Biermann | B64C 11/385 416/46 |
| 2,975,838 | A | * | 3/1961 | Corum | B64C 11/346 73/540 |
| 3,321,023 | A | * | 5/1967 | Russell | B64C 11/346 416/157 R |
| 2012/0114485 | A1 | * | 5/2012 | Russ | B64C 11/303 416/44 |
| 2018/0363626 | A1 | * | 12/2018 | Baines | F01D 7/02 |

* cited by examiner

*Primary Examiner* — Aaron R Eastman
(74) *Attorney, Agent, or Firm* — Tarolli, Sundheim, Covell & Tummino LLP

(57) ABSTRACT

One example includes a passive rotor pitch control system. The system includes a counterweights that are each associated with one of a respective plurality of rotors and can be arranged to have a center of mass configured to provide a pitch torque about a pitch axis associated with the respective one of the rotors in response to rotation of the rotors about a rotation axis. The system also includes a spring forcer comprising a pitch rod and a spring configured to provide a spring force on the pitch rod. The system further includes a pitch change assembly coupled to the counterweights and the pitch rod. The pitch change assembly can be configured to rotate a pitch of each of the rotors from a first pitch state to a second pitch state in response to a sum of pitch torques associated with the counterweights being greater than the spring force.

18 Claims, 6 Drawing Sheets

PASSIVE ROTOR PITCH CONTROL SYSTEM

TECHNICAL FIELD

The present disclosure relates generally to aviation, and specifically to a passive rotor pitch control system.

BACKGROUND

For many decades, aircraft have been implemented for a variety of uses as means of transportation, reconnaissance, and warfare. Different types of aircraft have been historically implemented for different purposes. Traditional airplanes implement wings for aerodynamic lift and can typically fly faster and in an aerodynamically efficient manner. However, vertical takeoff and landing (VTOL) aircraft are typically used for operations where speed is not necessarily required. Additionally, VTOL aircraft allow for more space efficient takeoff and landing procedures by not requiring a runway that allows the aircraft to accelerate during takeoff and decelerate during landing. As some flight operations became increasingly more dangerous or tedious, unmanned aerial vehicles (UAV) have been developed as a means for replacing pilots in the aircraft for controlling the aircraft.

SUMMARY

One example includes a passive rotor pitch control system. The system includes a counterweights that are each associated with one of a respective plurality of rotors and can be arranged to have a center of mass configured to provide a pitch torque about a pitch axis associated with the respective one of the rotors in response to rotation of the rotors about a rotation axis. The system also includes a spring forcer comprising a pitch rod and a spring configured to provide a spring force on the pitch rod. The system further includes a pitch change assembly coupled to the counterweights and the pitch rod. The pitch change assembly can be configured to rotate a pitch of each of the rotors from a first pitch state to a second pitch state in response to a sum of pitch torques associated with the counterweights being greater than the spring force.

Another example includes a method for operating a vertical takeoff and landing (VTOL) vehicle comprising a rotor assembly that includes a passive rotor pitch control system. The method includes activating the rotor assembly to rotate to provide a pitch torque about a pitch axis associated with each of a plurality of rotors of the rotor assembly. The method also includes converting a sum of the pitch torques about each of the pitch axes into an axial force on a pitch rod. The method also includes increasing the angular velocity of rotation of the rotor assembly beyond a threshold angular velocity to increase the axial force greater than a spring force acting opposite the axial force on the pitch rod to rotate a pitch of each of the rotors from a first pitch state to a second pitch state via a pitch change assembly to provide lift of the VTOL vehicle for takeoff via the rotors. The method further includes decreasing the angular velocity of rotation of the rotor assembly less than the threshold angular velocity to decrease the axial force less than the spring force on the pitch rod to rotate the pitch of each of the rotors from the second pitch state to the first pitch state via the pitch change assembly to provide horizontal flight of the VTOL vehicle via the rotors.

Another example includes a rotor assembly system. The system includes a set of rotors that are configured to rotate at an angular velocity to provide thrust. The system also includes a passive rotor pitch control system. The passive rotor pitch control system includes a counterweights that are each associated with one of a respective plurality of rotors and can be arranged to have a center of mass configured to provide a pitch torque about a pitch axis associated with the respective one of the rotors in response to rotation of the rotors about a rotation axis. The passive rotor pitch control system also includes a spring forcer comprising a pitch rod and a spring configured to provide a spring force on the pitch rod. The passive rotor pitch control system further includes a pitch change assembly comprising a scotch yoke mechanism coupled to the counterweights and the pitch rod. A sum of the pitch torques provided by the counterweights can be provided on the scotch yoke mechanism to provide an axial force on the pitch rod opposite the spring force. The pitch change assembly can be configured to rotate a pitch of each of the rotors from a first pitch state to a second pitch state in response to the angular velocity being greater than a threshold angular velocity at which the axial force becomes greater than the spring force.

DETAILED DESCRIPTION

Figure 1:
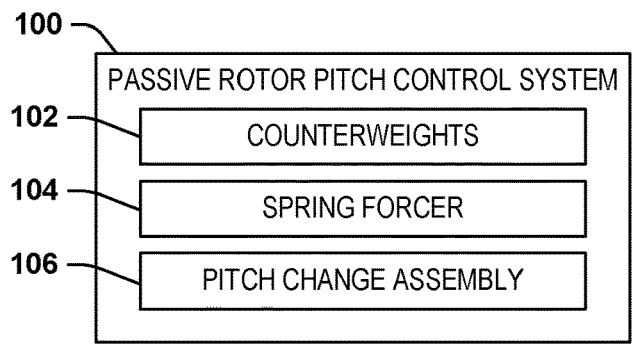
FIG. 1 illustrates an example block diagram of a passive rotor pitch control system.

The present disclosure relates generally to aviation, and specifically to a passive rotor pitch control system. The passive rotor pitch control system can be implemented in any of a variety of aviation applications in which the pitch of a rotor can be switched between a first pitch state and a second pitch state. For example, the passive rotor pitch control system can be implemented on a vertical takeoff and landing (VTOL) vehicle, such as to implement a first pitch state for takeoff/landing/hover and a second pitch state for horizontal flight. The passive rotor pitch control system can be included in a rotor assembly that includes a plurality of rotors that are each configured to rotate about a pitch axis, such as in response to a change in angular velocity of rotation of the rotors, thereby changing the thrust of the rotors. As described herein, the term "rotor" is intended to also or alternatively refer to "propeller", such that the concepts and terms can be considered interchangeable as described herein. Additionally, while the application describes use of the passive rotor pitch control system on a VTOL vehicle, the passive rotor pitch control system can likewise be used on other aircraft, such as to provide short field takeoff and landing of an aircraft, or for an aircraft that may require higher power for takeoff and climb than needed for cruising speed, such as for a long endurance, efficient, and/or quiet cruise.

The passive rotor pitch control system can include a plurality of counterweights that are each associated with one of the rotors. The counterweights can be arranged to have a center of mass that is offset from the pitch axis. Therefore, the counterweights can provide a pitch torque about the pitch axis in response to rotation of the rotors about a rotation axis that is orthogonal to the pitch axes of the respective rotors. The passive rotor pitch control system also includes a spring forcer that includes a spring and a pitch rod. The spring is configured to provide a spring force on the pitch rod along an axis of the pitch rod. As an example, the axis can correspond to or can be coaxial with the rotation axis of the rotors. The spring force applied on the pitch rod can nominally (e.g., at no rotation of the rotors) set the rotors in the first pitch state, such as to have a relatively higher pitch. As an example, the first pitch state can be implemented for horizontal flight of the VTOL vehicle.

The passive rotor pitch control system further includes a pitch change assembly that is coupled to the counterweights and to the pitch rod. The pitch change assembly can include a scotch yoke mechanism that is configured to convert a sum of the pitch torques associated with the respective counterweights into an axial force on the pitch rod that is opposite the spring force. As an example, the spring of the spring forcer can have a spring constant that is selected to correspond to a predetermined threshold angular velocity of rotation of the rotors. Therefore, in response to the rotation of the rotors exceeding the threshold angular velocity, the axial force resulting from the sum of the pitch torques can exceed the spring force. Accordingly, the pitch change assembly can change the pitch of the rotors from the first pitch state to a second pitch state having a relatively lower pitch than the first pitch state. As an example, the second pitch state can be implemented for vertical flight (e.g., takeoff, landing, and/or hover) of the VTOL vehicle. Accordingly, as described herein, the passive rotor pitch control system can provide a purely mechanical mechanism for controlling the pitch of the rotors between two pitch states to provide for a more efficient aerodynamic flight of the VTOL vehicle.

As a first example, such as for a two-rotor assembly, the scotch yoke mechanism can include a yoke that includes a planar yoke surface coupled to the pitch rod, a slider block that is configured to slide along and against the planar yoke surface, and a slider pin that extends through the slider block and is coupled to a bearing assembly associated with a given one of the rotors. Therefore, the pitch torque provided by the counterweights can provide a rotational force of the slider block about the respective pitch axis. In response to the sum of the pitch torques exceeding the spring force, the rotational force pushing upon the planar yoke surface overcomes the spring force, resulting in the slider block sliding along the planar yoke surface to rotate the respective rotor about the pitch axis.

As a second example, such as for a three or more rotor assembly, the scotch yoke mechanism can include a yoke that includes a housing enclosing the pitch rod and first rotating joints arranged exterior to the housing. The scotch yoke mechanism can also include pitch arms each coupled at a first end to one of the first rotating joints and coupled at a second end to one of the counterweights via a respective one of the second rotating joints. Thus, the pitch torque provided by the respective counterweight is provided along the pitch arm via the second rotating joint, such that the pitch arm provides a component of the axial force on the pitch rod opposite the spring force via the first rotating joint on the housing. In response to the sum of the pitch torques exceeding the spring force, the pitch arms pushing on the housing overcomes the spring force, resulting in the housing and the pitch rod pushing against the spring force to rotate the respective rotors about the pitch axes.

FIG. 1 illustrates an example block diagram of a passive rotor pitch control system 100. The passive rotor pitch control system 100 can be implemented in any of a variety of aviation applications in which the pitch of a rotor can be switched between a first pitch state and a second pitch state. The passive rotor pitch control system 100 can be included in a rotor assembly that includes a plurality of rotors of a vertical takeoff and landing (VTOL) vehicle. Thus, each of the rotors can rotate about a pitch axis, such as in response to a change in angular velocity of rotation of the rotors (e.g., of a rotor assembly, such as including the passive rotor pitch control system 100), thereby changing the thrust of the rotors. For example, the first pitch state can correspond to a relatively higher pitch of the rotors that can be employed at a relatively lower angular velocity of the rotors, such as for horizontal flight of the VTOL vehicle. As another example, the second pitch state can correspond to a relatively lower pitch of the rotors that can be employed at a relatively higher angular velocity of the rotors, such as for takeoff, landing, and/or hover of the VTOL vehicle.

In the example of FIG. 1, the passive rotor pitch control system 100 includes a plurality of counterweights 102, with each counterweight 102 being associated with one of the rotors. The counterweights 102 can be arranged to have a center of mass that is offset from the pitch axis of the respective rotor. Therefore, the counterweights 102 can provide a pitch torque about the pitch axis in response to rotation of the rotors about a rotation axis that is orthogonal to the pitch axes of the respective rotors. For example, the pitch torque can be proportional to an angular velocity of rotation of the rotors. As a first example, the passive rotor pitch control system 100 can include a single counterweight 102 for each rotor, or can include a set of counterweights 102 (e.g., two counterweights 102) arranged equal and opposite the rotor to provide a cooperative pitch torque about the pitch axis.

The passive rotor pitch control system 100 also includes a spring forcer 104. The spring forcer 104 can include a spring and a pitch rod, such that the spring provides a spring force on the pitch rod along a longitudinal axis of the pitch rod. As an example, the longitudinal axis can correspond to or can be coaxial with the rotation axis of the rotors. The spring force applied on the pitch rod can nominally (e.g., at no rotation of the rotors) set the rotors in the first pitch state, such as corresponding to a relatively higher pitch (e.g., for horizontal flight of the VTOL vehicle).

The passive rotor pitch control system 100 further includes a pitch change assembly 106 that is coupled to the counterweights 102 and to the pitch rod. As an example, the pitch change assembly 106 can include a scotch yoke mechanism that is configured to convert a sum of the pitch torques associated with the respective counterweights 102 into an axial force on the pitch rod of the spring forcer 104 that is opposite the spring force provided by the spring of the spring forcer 104. As an example, the spring of the spring forcer 104 can have a spring constant that is selected to correspond to a predetermined threshold angular velocity of rotation of the rotors. Therefore, in response to the rotation of the rotors exceeding the threshold angular velocity, the axial force resulting from the sum of the pitch torques can exceed the spring force. Accordingly, the pitch change assembly 106 can change the pitch of the rotors from the first pitch state to the second pitch state, such as corresponding to a relatively lower pitch than the first pitch state (e.g., for takeoff, landing, and/or hover of the VTOL vehicle).

Accordingly, as described herein, the passive rotor pitch control system 100 can provide a purely mechanical mechanism for controlling the pitch of the rotors between two pitch states to provide for a more efficient aerodynamic flight of the VTOL vehicle. Therefore, the passive rotor pitch control system 100 can be implemented in a simplistic manner to provide pitch control of the rotors of the VTOL vehicle. For example, by implementing a purely mechanical solution to pitch control, electronics and associated equipment that can be expensive and/or prone to failure can be obviated in the design of the rotor pitch control.

Figure 2:
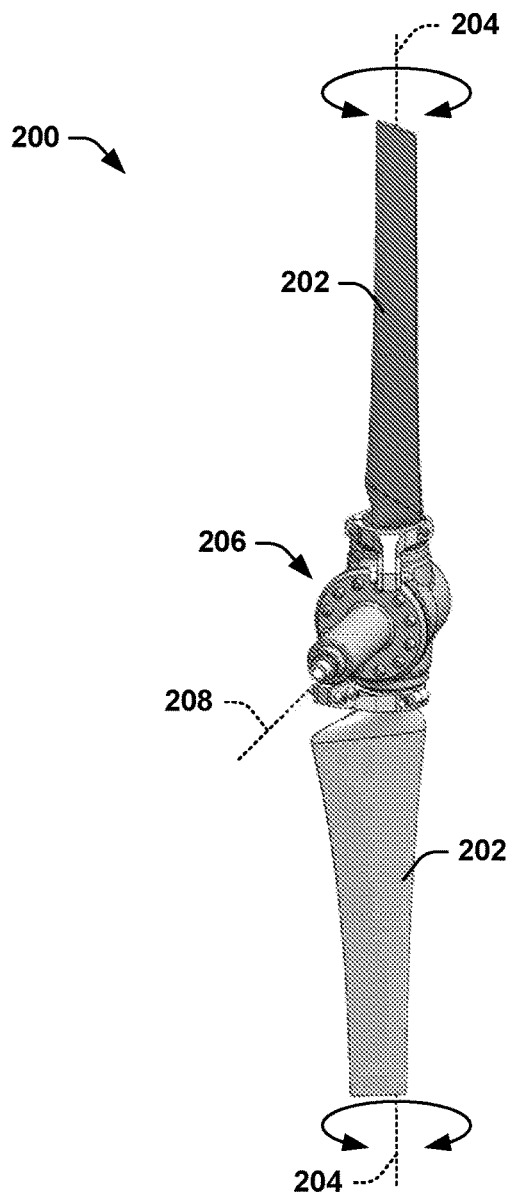
FIG. 2 illustrates an example of a rotor assembly.

FIG. 2 illustrates an example of a rotor assembly 200. The rotor assembly 200 can be implemented on an aircraft, such as a VTOL vehicle. The rotor assembly 200 includes a pair of rotors 202 that are each configured to rotate about a pitch axis 204, thereby changing pitch of the rotors 202. The rotor assembly 200 also includes a passive rotor pitch control system 206 that is configured to provide passive pitch control of the rotors 202 about the pitch axis 204. The passive rotor pitch control system 206 can correspond to the passive rotor pitch control system 100 in the example of FIG. 1. Therefore, reference is to be made to the example of FIG. 1 in the description of the example of FIG. 2.

As described herein, the passive pitch control can be implemented based on rotation of the entire rotor assembly 200 about a rotation axis 208. As described herein, the rotors 202 can rotate about the pitch axis 204, thereby changing the pitch of the rotors 202, based on an angular velocity of the rotation of the rotor assembly 200 about the rotation axis 208. For example, the passive rotor pitch control system 206 can be configured to change the pitch of the rotors 202 about the pitch axis 204 from a first pitch state to a second pitch state in response to the angular velocity of rotation of the rotor assembly 200 greater than a threshold angular velocity. For example, the first pitch state can correspond to a relatively higher pitch of the rotors 202 that can be employed at a relatively lower angular velocity of the rotor assembly 200, such as for horizontal flight of the associated VTOL vehicle. As another example, the second pitch state can correspond to a relatively lower pitch of the rotors 202 that can be employed at a relatively higher angular velocity of the rotor assembly 200, such as for takeoff, landing, and/or hover of the associated VTOL vehicle.

Figure 3:
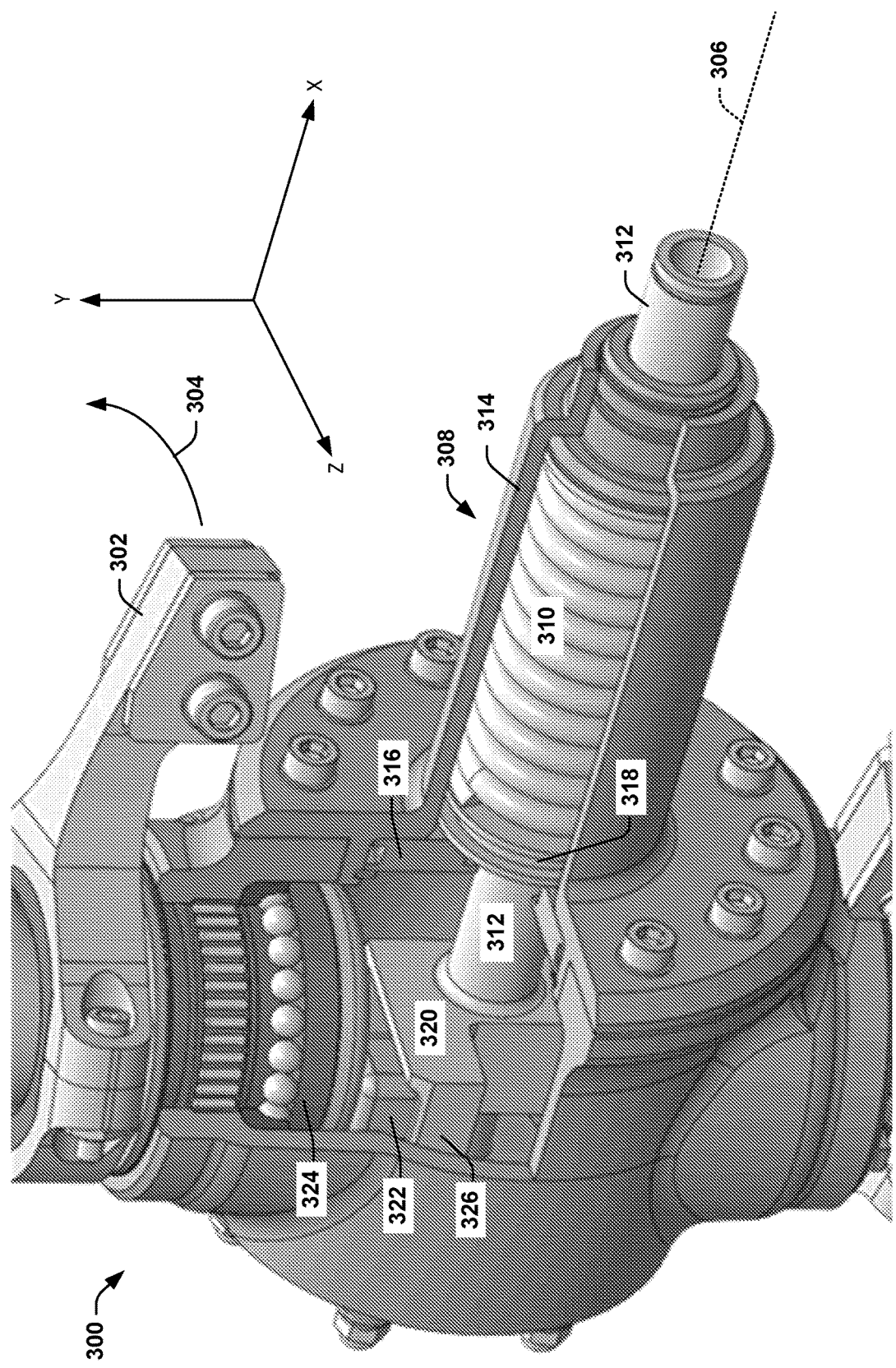
FIG. 3 illustrates an example of a passive rotor pitch control system.

FIG. 3 illustrates an example of a passive rotor pitch control system 300. The passive rotor pitch control system 300 can correspond to the passive rotor pitch control system 100 in the example of FIG. 1 and/or the passive rotor pitch control system 206 in the example of FIG. 2. As an example, the passive rotor pitch control system 300 can be implemented in a rotor assembly that includes two rotors (e.g., the rotor assembly 200). Therefore, reference is to be made to the examples of FIGS. 1 and 2 in the following description of the example of FIG. 3.

The passive rotor pitch control system 300 includes a pair of counterweights 302, with each counterweight 302 being associated with one of the rotors 202 (not shown in the example of FIG. 3). In the example of FIG. 3, only a single counterweight 302 for a single rotor 202 is shown, but the passive rotor pitch control system 300 can included another counterweight associated with the opposite rotor 202. The counterweights 302 can be arranged to have a center of mass that is offset from the pitch axis 204 (parallel to the Y-axis in the example of FIG. 3) of the respective rotor 202. Therefore, the counterweights 302 can provide a pitch torque about the pitch axis 204, the pitch torque being demonstrated by an arrow 304, in response to rotation of the rotor assembly 200 about a rotation axis 306 (parallel to the X-axis in the example of FIG. 3) that is orthogonal to the pitch axis 204 of the respective rotors 202. For example, the pitch torque 304 can be proportional to an angular velocity of rotation of the rotor assembly 200. In the example of FIG. 3, the passive rotor pitch control system 300 includes a single counterweight 302 for each rotor 202, but could instead include a set of counterweights 302 (e.g., two counterweights 302) arranged equal and opposite the rotor 202 to provide a cooperative pitch torque 304 about the pitch axis 204.

The passive rotor pitch control system 300 also includes a spring forcer 308. The spring forcer 308 includes a spring 310 and a pitch rod 312 that is arranged in and extends beyond the spring 310. The spring forcer 308 also includes a forcer housing 314 that is configured to enclose the spring 310 and a portion of the pitch rod 312. The forcer housing 314 is bounded by a cap 316 that can include an inner grommet (not shown) against the pitch rod 312 to provide a liquid seal for the forcer housing 314. Therefore, the interior of the forcer housing 314 can be filled with a high viscosity fluid (e.g., oil). In the example of FIG. 3, the spring forcer 308 also includes a dividing disk 318 that is formed integral with the pitch rod 312 and is arranged within the interior volume of the forcer housing 314. The spring 310 can be arranged between an end of the forcer housing 314 and the dividing disk 318, such that, based on the integral formation of the dividing disk 318 with the pitch rod 312, the spring 310 provides a spring force (in the −X direction) on the pitch rod 312 along a longitudinal axis of the pitch rod 312 coaxially with the rotation axis 306.

The passive rotor pitch control system 300 further includes a pitch change assembly (demonstrated generally in the interior of the passive rotor pitch control system 300) that is coupled to the counterweights 302 and to the pitch rod 312. In the example of FIG. 3, the pitch change assembly includes a scotch yoke mechanism that is configured to convert a sum of the pitch torques 304 associated with the respective counterweights 302 into an axial force (in the +X direction) on the pitch rod 312 that is opposite the spring force provided by the spring 310. The scotch yoke mechanism includes a yoke 320 that is coupled to (e.g., formed integral with) the pitch rod 312. The yoke 320 includes a planar yoke surface (opposite the demonstrated surface of the yoke 320, in the YZ-plane). The scotch yoke mechanism also includes a slider block 322 that is held in contact with the planar yoke surface by the spring force of the spring 310. The slider block 322 is coupled via a slider pin (not shown) to a bearing assembly 324 that provides rotation of the respective rotor 202 about the pitch axis 204. The slider pin extends from the bearing assembly 324 along the Y-axis parallel to the pitch axis 204 and proximal to a periphery of the bearing assembly 324. The slider pin thus allows rotation of the slider block 322 about the slider pin (about the Y-axis) while providing translational motion of the slider block 322 (in the XZ-plane) in response to rotation of the rotor 202 about the pitch axis 204.

As described herein, the pitch change assembly in the example of FIG. 3 can thus correspond to the yoke 320, the slider block 322, the slider pin, and the bearing assembly 324, as well as associated mechanical components. As described herein, the scotch yoke mechanism can thus correspond to the yoke 320, the slider block 322, and the slider pin, as well as associated mechanical components. The pitch change assembly of the example of FIG. 3 is demonstrated with respect to one of the rotors 202, such that the passive rotor pitch control system 300 can include a second set of the demonstrated components of the pitch change assembly in a mirror image arrangement with respect to the other rotor 202.

The example of FIG. 3 demonstrates a nominal position of the passive rotor pitch control system 300 corresponding to the first pitch state (e.g., relatively higher pitch), such that the slider block is in a first position in a corner of the yoke 320 formed by the planar yoke surface and a first wall 326 (in the XY-plane) of the yoke 320 that is orthogonal with the planar yoke surface. The nominal position can thus correspond initially to the VTOL vehicle at rest (e.g., before engine ignition or motor start). As described above, in response to rotation of the rotor assembly 200 about the rotation axis 306, the counterweights 302 can each provide the pitch torque 304 about the pitch axis 204. Therefore, the pitch torque 304 of the respective rotor 202 about the pitch axis 204 provides a rotational force of the slider block 322 that includes a force component in the X-direction (e.g., X-component) against the planar yoke surface, and thus on the pitch rod 312 along on the X-axis opposite the spring force.

As an example, the spring 310 of the spring forcer 308 can have a spring constant that is selected to correspond to a predetermined threshold angular velocity of rotation of the rotor assembly 200. Therefore, in response to the angular velocity of the rotation of the rotor assembly 200 exceeding the threshold angular velocity, the sum of the pitch torques 304 can result in the axial force of the pitch rod 312 exceeding the spring force provided by the spring 310. In the example of FIG. 3, the X-components of the rotational force of the respective slider blocks 322 pushing upon the planar yoke surface, as provided by the respective pitch torques 304, collectively overcomes (e.g., becomes greater than) the spring force. As a result, the yoke 320 pushes the pitch rod 312 along the X-axis. The movement of the yoke 320 in the X-direction allows the slider block 322 to slide against the planar yoke surface based on a-Z component of the rotational force resulting from the pitch torque 304. Therefore, as the yoke 320 moves in the X-direction from the X-component of the slider block 322 pushing on the planar yoke surface, the bearing assembly 324 rotates about the pitch axis 204, thereby rotating the respective rotor 202 about the pitch axis 204. The −Z component of the rotational force acting on the slider block 322 continues until slider block 322 is stopped at a second wall of the yoke 320 that is orthogonal with the planar yoke surface and opposite the first wall 326. Accordingly, the stopping of the slider block 322 at the second wall corresponds to the second pitch state, ending the rotation of the rotor 202 about the pitch axis 204. Thus, the rotors 202 can transition to the second pitch state to provide for takeoff or landing of the associated VTOL vehicle.

The second pitch state can be maintained as long as the passive rotor pitch control system 300 continues to rotate at an angular velocity that is greater than the threshold angular velocity. Therefore, the sum of the pitch torques 304 can continue to provide the X-component of the rotational force of the slider block 322 pushing against the planar yoke surface to provide the axial force along the pitch rod 312 in the +X direction greater than the spring force in the −X direction. In response to the rotation of the rotor assembly 200 decreasing less than the threshold angular velocity (e.g., in response to a transition to horizontal level flight of the VTOL vehicle), the spring force becomes greater than the axial force provided by the pitch torques 304 via the pitch control assembly. Accordingly, the movement of the pitch control assembly operates in the reverse of as described above regarding the transition of the passive rotor pitch control system 300 from the first pitch state to the second pitch state. Particularly, the yoke 320 is pushed in the −X direction by the spring force, resulting in the slider block 322 sliding along the planar yoke surface from the second wall to the first wall 326 in a reverse rotation direction of the bearing assembly 324. Accordingly, the stopping of the slider block 322 at the first wall 326 corresponds to a return to the first pitch state, ending the reverse rotation of the rotor 202 about the pitch axis 204.

In the example of FIG. 3, the transition between the first and second pitch states can be provided in a slow manner based on the arrangement of the spring forcer 308. As described above, the interior of the forcer housing 314 can include a high viscosity fluid. As an example, the dividing disk 318 can include an outer grommet (not shown) arranged between the dividing disk 318 and the interior of the forcer housing 314 to divide the interior of the forcer housing 314 into two portions. Additionally, the dividing disk 318 can include at least one through-hole (not shown) that can provide flow-through of the high viscosity fluid. Therefore, as the pitch rod 312 moves during a transition of the passive rotor pitch control system 300 between the first and second pitch states, the dividing disk 318 moves within the interior of the forcer housing 314. The movement of the dividing disk 318 results in a change in the relative size between the two portions of the interior of the forcer housing 314, thus necessitating that the high viscosity fluid flow through the through-holes of the dividing disk 318. Accordingly, based on the limitation of the flow-rate of the high viscosity fluid through the through-holes of the dividing disk 318, the movement of the pitch rod 312 is speed limited, thus providing a slow transition between the first and second pitch states. As a result, damage resulting from mechanical shock that could occur from an otherwise rapid transition is mitigated in the passive rotor pitch control system 300.

The examples of FIGS. 2 and 3 therefore provide one example of a passive rotor pitch control system that can provide a purely mechanical mechanism for controlling the pitch of the rotors between two pitch states to provide for a more efficient aerodynamic flight of the VTOL vehicle. Accordingly, the passive rotor pitch control system 300 can be implemented to provide a simplistic pitch control mechanism of the rotors of the associated VTOL vehicle.

Figure 4:
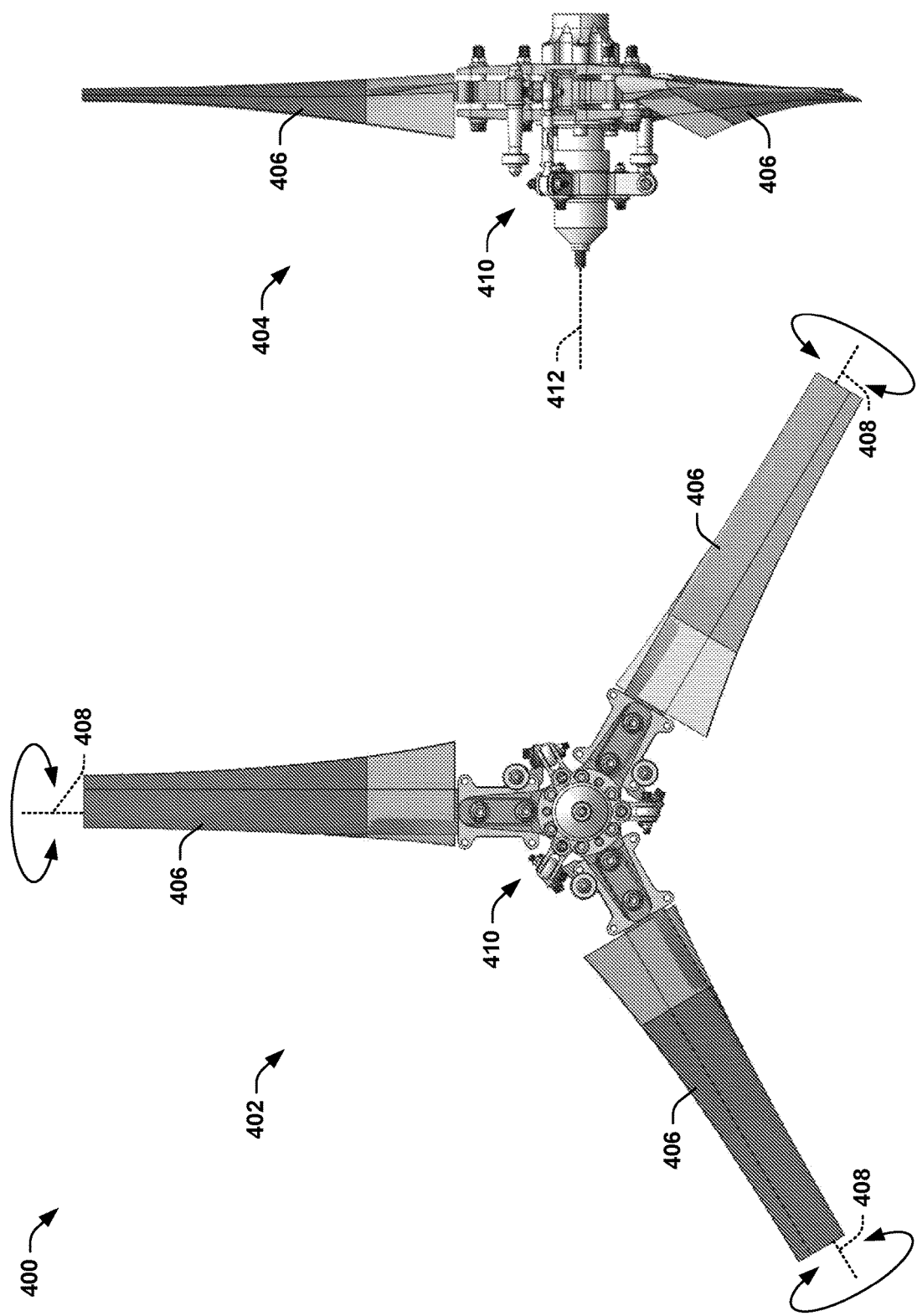
FIG. 4 illustrates another example of a rotor assembly.

FIG. 4 illustrates another example of a rotor assembly 400. The rotor assembly 400 can be implemented on an aircraft, such as a VTOL vehicle. The rotor assembly 400 is demonstrated in a first view 402 corresponding to a front view and a second view 404 corresponding to a side view. The rotor assembly 400 includes a set of three rotors 406 that are each configured to rotate about respective pitch axes 408, thereby changing pitch of the rotors 406. The rotor assembly 400 also includes a passive rotor pitch control system 410 that is configured to provide passive pitch control of the rotors 406 about the respective pitch axes 408. The passive rotor pitch control system 410 can correspond to the passive rotor pitch control system 100 in the example of FIG. 1. Therefore, reference is to be made to the example of FIG. 1 in the description of the example of FIG. 4.

As described herein, the passive pitch control can be implemented based on rotation of the entire rotor assembly 400 about a rotation axis 412. As described herein, the rotors 406 can rotate about the respective pitch axes 408, thereby changing the pitch of the rotors 406, based on an angular velocity of the rotation of the rotor assembly 400 about the rotation axis 412. For example, the passive rotor pitch control system 410 can be configured to change the pitch of the rotors 406 about the respective pitch axes 408 from a first pitch state to a second pitch state in response to the angular velocity of rotation of the rotor assembly 400 greater than a threshold angular velocity. For example, the first pitch state can correspond to a relatively higher pitch of the rotors 406 that can be employed at a relatively lower angular velocity of the rotor assembly 400, such as for horizontal flight of the associated VTOL vehicle. As another example, the second pitch state can correspond to a relatively lower pitch of the rotors 406 that can be employed at a relatively higher angular velocity of the rotor assembly 400, such as for takeoff, landing, and/or hover of the associated VTOL vehicle.

Figure 5:
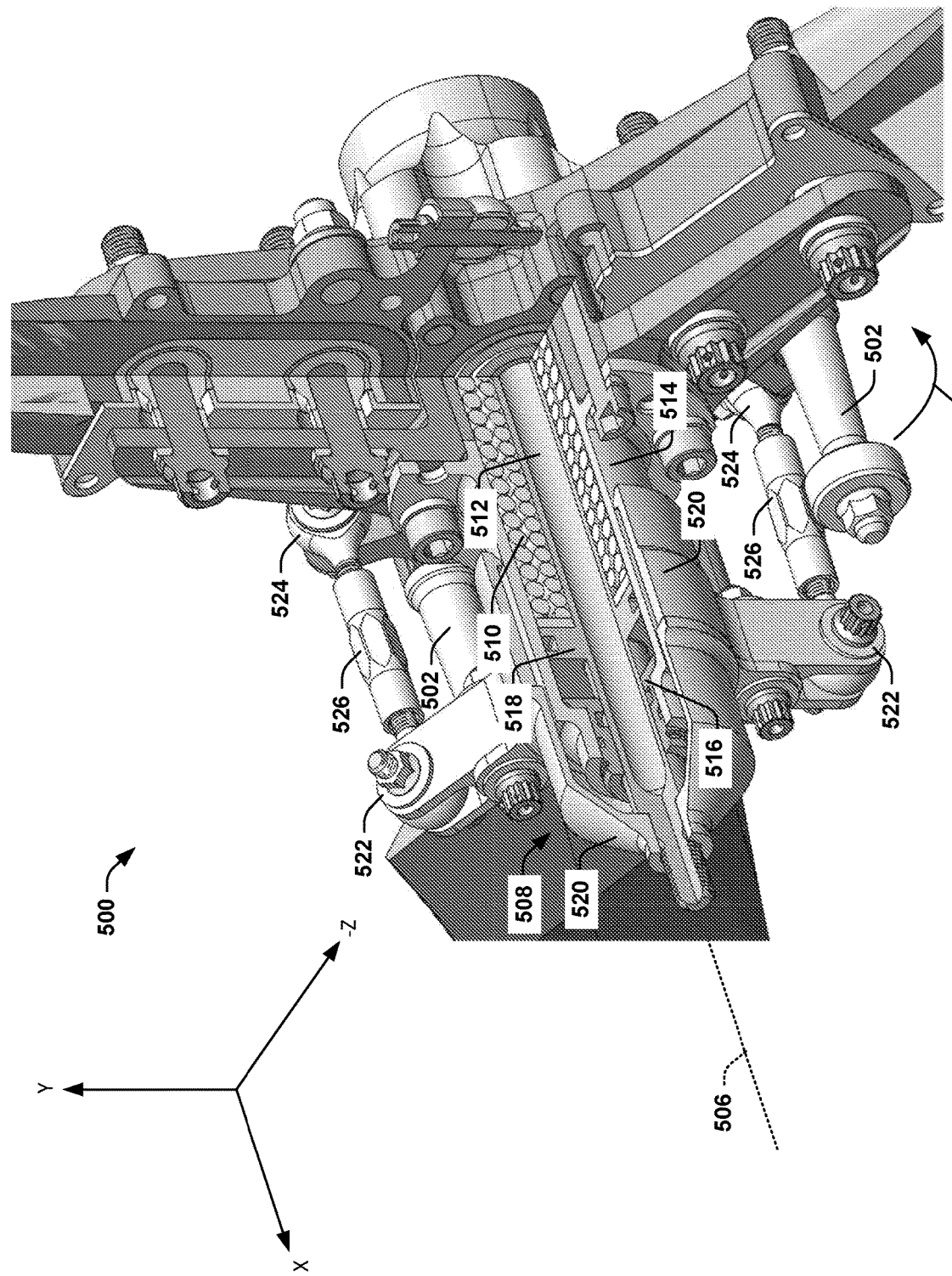
FIG. 5 illustrates another example of a passive rotor pitch control system.

FIG. 5 illustrates another example of a passive rotor pitch control system 500. The passive rotor pitch control system 500 can correspond to the passive rotor pitch control system 100 in the example of FIG. 1 and/or the passive rotor pitch control system 410 in the example of FIG. 4. As an example, the passive rotor pitch control system 500 can be implemented in a rotor assembly that includes three or more rotors (e.g., the rotor assembly 400). Therefore, reference is to be made to the examples of FIGS. 1 and 4 in the following description of the example of FIG. 5.

The passive rotor pitch control system 500 includes a set of counterweights 502, with each counterweight 502 being associated with one of the rotors 406 (not shown in the example of FIG. 5). In the example of FIG. 5, only a single counterweight 502 for a single rotor 406 is shown, but the passive rotor pitch control system 500 can included include counterweights associated with the other rotors 406. Each counterweight 502 can be arranged to have a center of mass that is offset from the respective pitch axis 408 of the respective rotor 406. Therefore, each of the counterweights 502 can provide a pitch torque about the respective pitch axis 408, the pitch torque being demonstrated by an arrow 504, in response to rotation of the rotor assembly 400 about a rotation axis 506 (parallel to the X-axis in the example of FIG. 5). For example, the pitch torque 504 can be proportional to an angular velocity of rotation of the rotor assembly 400. In the example of FIG. 5, the passive rotor pitch control system 500 includes a single counterweight 502 for each rotor 406, but could instead include a set of counterweights 502 (e.g., two counterweights 502) arranged equal and opposite the rotor 406 to provide a cooperative pitch torque 504 about the pitch axis 408.

The passive rotor pitch control system 500 also includes a spring forcer 508. The spring forcer 508 includes a spring 510 and a pitch rod 512 that is arranged in and extends beyond the spring 510. The spring forcer 508 also includes a forcer housing 514 that is configured to enclose the spring 510 and a portion of the pitch rod 512. The forcer housing 514 is bounded by a cap 516 that can include an inner grommet (not shown) against the pitch rod 512 to provide a liquid seal for the forcer housing 514. Therefore, the interior of the forcer housing 514 can be filled with a high viscosity fluid (e.g., oil). In the example of FIG. 5, the spring forcer 508 also includes a dividing disk 518 that is formed integral with the pitch rod 512 and is arranged within the interior volume of the forcer housing 514. The spring 510 can be arranged between an end of the forcer housing 514 and the dividing disk 518, such that, based on the integral formation of the dividing disk 518 with the pitch rod 512, the spring 510 provides a spring force (in the +X direction) on the pitch rod 512 along a longitudinal axis of the pitch rod 512 coaxially with the rotation axis 506. Therefore, the spring forcer 508 is arranged similar to the spring forcer 308 in the example of FIG. 3 to provide the spring force and to provide for slow transitions between the first and second pitch states.

The passive rotor pitch control system 500 further includes a pitch change assembly (demonstrated generally at the exterior of the passive rotor pitch control system 500) that is coupled to the counterweights 502 and to the pitch rod 512. In the example of FIG. 5, the pitch change assembly includes a scotch yoke mechanism that is configured to convert a sum of the pitch torques 504 associated with the respective counterweights 502 into an axial force (in the −X direction) on the pitch rod 512 that is opposite the spring force provided by the spring 510. The scotch yoke mechanism includes an outer housing 520 that is fixed to the pitch rod 512, and thus slides along an exterior of the forcer housing 514 with motion of the pitch rod 512 along the X-axis. The scotch yoke mechanism also includes a set of first rotating joints 522 coupled to the outer housing 520, a set of second rotating joints 524 that are each coupled to a respective one of the counterweights 502, and a plurality of pitch arms 526. Each of the pitch arms 526 has a first end that is coupled to one of the first rotating joints 522 and a second end that is coupled to one of the second rotating joints 524.

As described herein, the pitch change assembly in the example of FIG. 5 can thus correspond to the outer housing 520, the first and second rotating joints 522 and 524, the pitch arms 526, and a bearing assembly (not shown) that facilitates rotation of the rotors 406 about the respective pitch axes 408, as well as associated mechanical components. As described herein, the scotch yoke mechanism can thus correspond to the outer housing 520, the first and second rotating joints 522 and 524, and the pitch arms 526, as well as associated mechanical components.

The example of FIG. 5 demonstrates a nominal position of the passive rotor pitch control system 500 corresponding to the first pitch state (e.g., relatively higher pitch), such that the outer housing 520 is extended to an extreme distal position based on the limits of the motion defined by the pitch arms 526. The nominal position can thus correspond initially to the VTOL vehicle at rest (e.g., before engine ignition or motor start). As described above, in response to rotation of the rotor assembly 400 about the rotation axis 506, the counterweights 502 can each provide the pitch torque 504 about the respective pitch axes 408. Therefore, the pitch torque 504 of the respective rotor 406 about the pitch axis 408 provides a rotational force on the respective pitch arm 526 via the second rotating joint 524, with the rotational force including a force component in the −X direction (e.g., a -X component), and thus on the outer housing 520 via the respective first rotating joint 522. The force component in the −X direction is thus provided on the pitch rod 512 along on the X-axis opposite the spring force.

Similar to as described above, the spring 510 of the spring forcer 508 can have a spring constant that is selected to correspond to a predetermined threshold angular velocity of rotation of the rotor assembly 400. Therefore, in response to the angular velocity of the rotation of the rotor assembly 400 exceeding the threshold angular velocity, the sum of the pitch torques 504 can result in the axial force of the pitch rod 512 exceeding the spring force provided by the spring 510. In the example of FIG. 5, the X-component of the rotational forces of the respective pitch arms 526 pulling on the outer housing 520, as provided by the respective pitch torques 504, collectively overcomes (e.g., becomes greater than) the spring force. As a result, the outer housing 520 pulls the pitch rod 512 in the −X direction. The movement of the outer housing 520 continues until the counterweights 502 achieve a mechanical motion limit, thereby stopping the outer housing 520 movement in the −X direction via the pitch arms 526 and the first and second rotating joints 522 and 524. Accordingly, the stopping of the outer housing 520 based on the mechanical motion limit of the counterweights 502 corresponds to the second pitch state, ending the rotation of the rotor 406 about the pitch axis 408. Thus, the rotors 406 can transition to the second pitch state to provide for takeoff or landing of the associated VTOL vehicle.

The second pitch state can be maintained as long as the passive rotor pitch control system 500 continues to rotate at an angular velocity that is greater than the threshold angular velocity. Therefore, the sum of the pitch torques 504 can continue to provide the −X component of the rotational force on the pitch arms 526 to provide the axial force along the pitch rod 512 in the −X direction greater than the spring force in the +X direction. In response to the rotation of the rotor assembly 400 decreasing less than the threshold angular velocity (e.g., in response to a transition to horizontal level flight of the VTOL vehicle), the spring force becomes greater than the axial force provided by the pitch torques 504 via the pitch control assembly. Accordingly, the movement of the pitch control assembly operates in the reverse of as described above regarding the transition of the passive rotor pitch control system 500 from the first pitch state to the second pitch state. Particularly, the spring 510 pushes the outer housing 520 in the +X direction, thus pulling the counterweights 502 and the associated rotors 406 via the pitch arms 526 and the first and second rotating joints 522 and 524. Accordingly, the stopping of the counterweights 502 to an opposite motion limit corresponds to a return to the first pitch state, ending the reverse rotation of the rotor 406 about the pitch axis 408.

The example of FIG. 5 therefore provides a second example of a passive rotor pitch control system that can provide a purely mechanical mechanism for controlling the pitch of the rotors between two pitch states to provide for a more efficient aerodynamic flight of the VTOL vehicle. Accordingly, the passive rotor pitch control system 500 can be implemented to provide a simplistic pitch control mechanism of the rotors of the associated VTOL vehicle. The design of the passive rotor pitch control system 500 can be provided to a rotor assembly that includes more than just three rotors.

Figure 6:
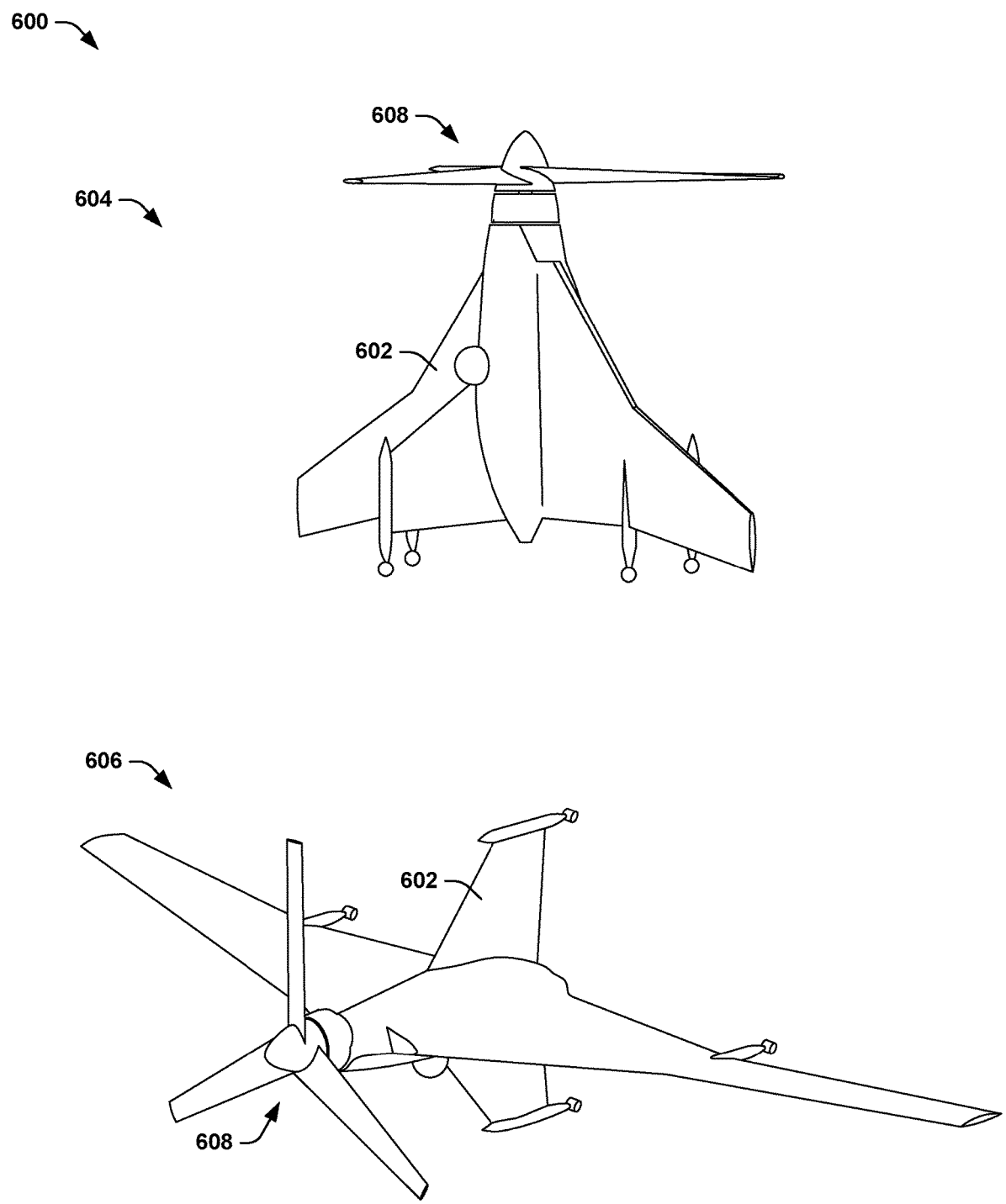
FIG. 6 illustrates an example of a vertical takeoff and landing (VTOL) vehicle.

FIG. 6 illustrates an example diagram 600 of a vertical takeoff and landing (VTOL) vehicle 602. The diagram 600 includes a first isometric plan view 604 of the VTOL vehicle 602 and a second isometric plan view 606 of the VTOL vehicle 602. The VTOL vehicle 602 is demonstrated in the first view 604 in a hover mode, such that the VTOL vehicle 602 is provided in a substantially vertical orientation, and the VTOL vehicle 602 is demonstrated in the example of the second view 606 in a level-flight mode, such that the VTOL vehicle 602 is provided in a substantially horizontal orientation. The VTOL vehicle 602 includes a rotor assembly 608 at a fore-section of the VTOL vehicle 602 that is substantially aligned with a central axis 610 of the VTOL vehicle 602. The central axis 610 can extend through an approximate center of the VTOL vehicle 602, such that the VTOL vehicle 602 can be approximately symmetrical about the central axis 610 in two orthogonal planes. The rotor assembly 608 is configured to provide vertical thrust in the hover mode and to provide horizontal thrust in the level-flight mode. Therefore, as described herein, the substantially vertical orientation and the substantially horizontal orientation of the VTOL vehicle 602 are defined with respect to the orientation of the central axis 610 relative to the surface of the Earth.

The rotor assembly 608 can include a passive rotor pitch control system, such as the passive rotor pitch control system 100 described in the example of FIG. 1. For example, given that the rotor assembly 608 includes three rotors in the example of FIG. 6, the rotor assembly 608 can include the passive rotor pitch control system 500 described in the example of FIG. 5 above. Therefore, the passive rotor pitch control system can provide passive pitch control of the rotors of the rotor assembly 608. For example, the passive rotor pitch control system can transition between a first pitch state, such as corresponding to a relatively high pitch for the level-flight mode demonstrated in the second view 606, and a second pitch state, such as corresponding to a relatively low pitch for the hover mode (e.g., for takeoff and landing) demonstrated in the first view 604. The passive rotor pitch control system can thus provide a purely mechanical mechanism for controlling the pitch of the rotors between the two pitch states to provide for a more efficient aerodynamic flight of the VTOL vehicle 602. Accordingly, the first pitch state can provide for a quieter and more fuel/energy efficient flight of the VTOL vehicle 602 while still allowing for the second pitch state to facilitate hover of the VTOL vehicle 602 in the second pitch state. Furthermore, because the passive rotor pitch control system of the rotor assembly 608 provides for a purely mechanical solution for pitch control, the rotor assembly 608 can include no electronic components that may be expensive and/or prone to failure.

While the example VTOL vehicle 602 is demonstrated as a tail-sitter aircraft, other types of aircraft that include the rotor assembly described herein are possible. For example, the rotor assembly could be arranged at the aft-section of the VTOL aircraft instead of the fore-section, such that the rotor system provides thrust to push the VTOL aircraft instead of pull the VTOL aircraft. As another example, the VTOL aircraft can include multiple rotor systems, such as arranged as coaxially-arranged counter-rotating rotor systems, or rotor systems provided on each wing of the VTOL aircraft. For example, the VTOL aircraft can include tilting wings and/or tilting rotor systems. Accordingly, the rotor system described herein can be arranged on any of a variety of different types of VTOL vehicle.

Figure 7:
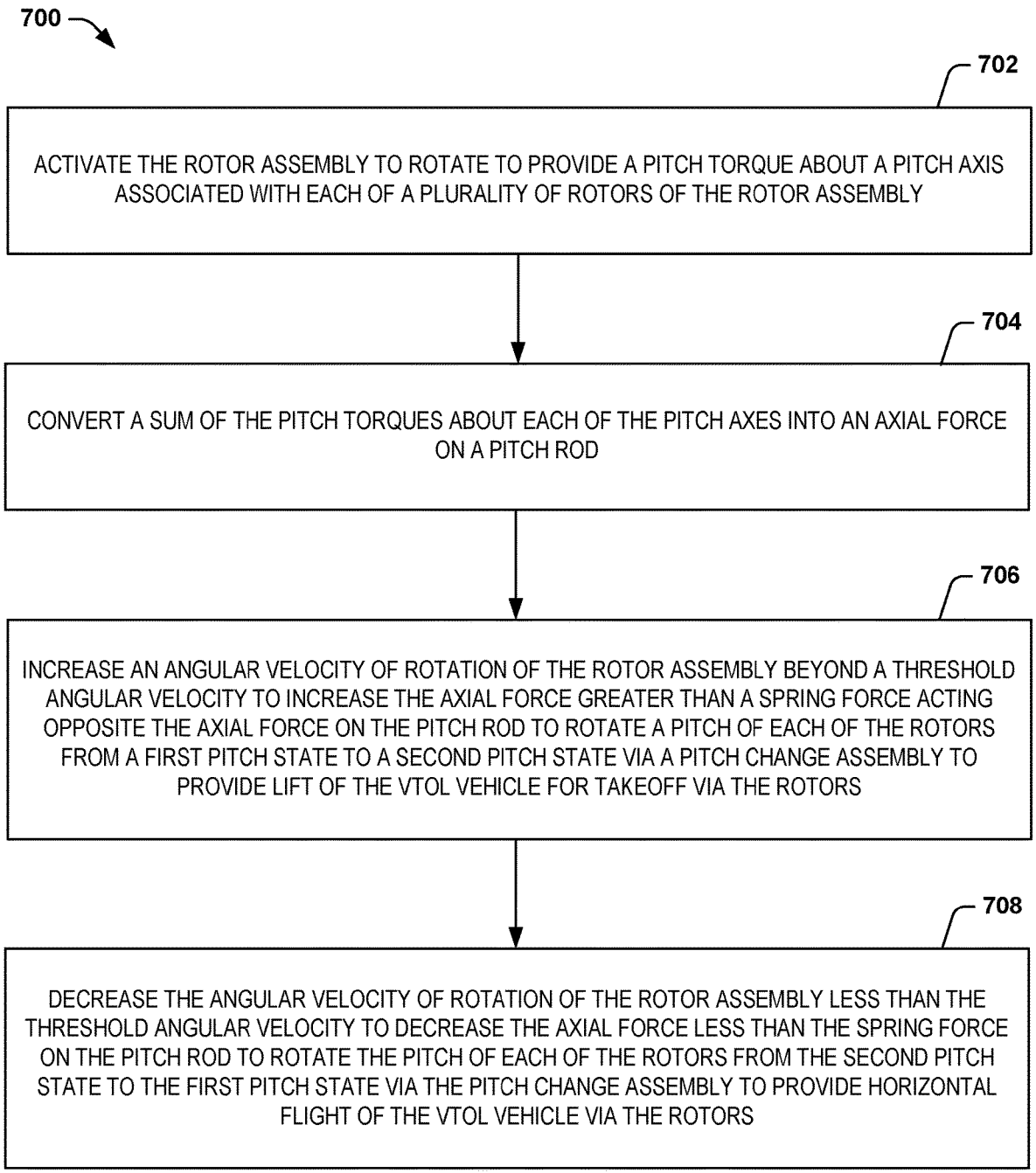
FIG. 7 illustrates an example of a method for operating a vertical takeoff and landing (VTOL) vehicle comprising rotors and a passive rotor pitch control system.

In view of the foregoing structural and functional features described above, a methodology in accordance with various aspects of the disclosure will be better appreciated with reference to FIG. 7. It is to be understood and appreciated that the method of FIG. 7 is not limited by the illustrated order, as some aspects could, in accordance with the present disclosure, occur in different orders and/or concurrently with other aspects from that shown and described herein. Moreover, not all illustrated features may be required to implement a methodology in accordance with an aspect of the present examples.

FIG. 7 illustrates an example of a method 700 for operating a vertical takeoff and landing (VTOL) vehicle (e.g., the VTOL vehicle 602) comprising a rotor assembly (e.g., the rotor assembly 200 or 400) and a passive rotor pitch control system (e.g., the passive rotor pitch control system 100). At 702, the rotor assembly is activated to rotate to provide a pitch torque about a pitch axis associated with each of a plurality of rotors (e.g., the rotors 202 or 402) of the rotor assembly. At 704, a sum of the pitch torques (e.g., the pitch torques 304 or 504) about each of the pitch axes (e.g., the pitch axes 204 or 404) is converted into an axial force on a pitch rod (e.g., the pitch rod 312 or 512). At 706, the angular velocity of rotation of the rotor assembly is increased beyond a threshold angular velocity to increase the axial force greater than a spring force acting opposite the axial force on the pitch rod to rotate a pitch of each of the rotors from a first pitch state to a second pitch state via a pitch change assembly to provide lift of the VTOL vehicle for takeoff via the rotors. At 708, the angular velocity of rotation of the rotor assembly is decreased less than the threshold angular velocity to decrease the axial force less than the spring force on the pitch rod to rotate the pitch of each of the rotors from the second pitch state to the first pitch state via the pitch change assembly to provide horizontal flight of the VTOL vehicle via the rotors. The angular velocity of rotation of the rotor assembly can again increase beyond the threshold angular velocity to increase the axial force greater than the spring force acting opposite the axial force on the pitch rod to rotate the pitch of each of the rotors from the first pitch state to the second pitch state via the pitch change assembly to provide lift of the VTOL vehicle for landing via the rotors.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A passive rotor pitch control system comprising:
   a plurality of counterweights, each of the counterweights being associated with one of a respective plurality of rotors and being arranged to have a center of mass configured to provide a pitch torque about a pitch axis associated with the respective one of the rotors in response to rotation of the rotors about a rotation axis;
   a spring forcer comprising a pitch rod and a spring configured to provide a spring force on the pitch rod; and
   a pitch change assembly coupled to the counterweights and comprising a scotch yoke mechanism coupled to the pitch rod, the scotch yoke mechanism providing an axial force on the pitch rod opposite the spring force in response to a sum of the pitch torques associated with the counterweights, the pitch change assembly being configured to rotate a pitch of each of the rotors from a first pitch state to a second pitch state in response to the axial force being greater than the spring force.

2. The system of claim 1, wherein the counterweights comprise a pair of counterweights associated with a respective pair of rotors, wherein the pitch rod is arranged along a first axis corresponding to the rotation axis about which the rotors rotate and along which the spring force is provided, wherein the scotch yoke mechanism comprises:
   a yoke coupled to the pitch rod, the yoke comprising a planar yoke surface arranged orthogonal with respect to the first axis;
   a slider block that is associated with one of the rotors and configured to slide against and push on the planar yoke surface; and
   a slider pin coupled to one of the rotors and extending through the slider block along an axis parallel to the pitch axis, such that, in response to the sum of the pitch torques associated with the counterweights being greater than the spring force, the slider pin rotates about the pitch axis to slide the slider pin along the planar yoke surface to provide the axial force on the planar yoke surface along the first axis opposite the spring force.

3. The system of claim 2, wherein the yoke comprises a pair of planar yoke surfaces arranged orthogonal with respect to the first axis;
   wherein the slider block is a first of a pair of slider blocks that are each associated with one of the rotors and configured to slide against and push on the respective pair of planar yoke surfaces; and
   wherein the slider pin is a first of a pair of slider pins coupled to a respective one of the rotors through the respective one of the slider blocks along respective axes parallel to the pitch axis, such that, in response to the sum of the pitch torques associated with the counterweights being greater than the spring force, the slider pins each rotate about the pitch axis to slide the respective one of the slider pins along the respective one of the planar yoke surfaces to provide the axial force on the planar yoke surface along the first axis opposite the spring force.

4. The system of claim 1, wherein the counterweights comprise a set of counterweights associated with a respective set of rotors greater than two, wherein the scotch yoke mechanism comprises:
   a yoke coupled to the pitch rod, the yoke comprising a housing enclosing the pitch rod and further comprising a first rotating joint arranged exterior to the housing; and
   a pitch arm coupled at a first end to the first rotating joint and coupled at a second end to one of the counterweights via a second rotating joint, wherein the pitch torque provided by the respective one of the counterweights is provided along the pitch arm via the second rotating joint, such that the pitch arm provides a component of the axial force on the pitch rod opposite the spring force via the first rotating joint on the housing.

5. The system of claim 4, wherein the first rotating joint is a first of a plurality of first rotating joints arranged exterior to the housing;
   wherein the pitch arm is a first of a plurality of pitch arms, each of the pitch arms coupled at a first end to one of the first rotating joints and coupled at a second end to a respective one of the counterweights via one of a plurality of second rotating joints, wherein the pitch torque provided by each of the counterweights is provided along the respective one of the pitch arms via the respective one of the second rotating joints, such that the pitch arms each provide a respective component of the axial force on the pitch rod opposite the spring force via the respective one of the first rotating joints on the housing.

6. The system of claim 1, wherein the spring forcer further comprises:
   a forcer housing enclosing the spring and at least a portion of pitch rod and being filled with a viscous fluid; and
   a dividing disk formed integral with and about the pitch rod, the dividing disk dividing an interior of the forcer housing into a first portion and a second portion, the dividing disk comprising at least one through-hole to provide flow-through of the viscous fluid to facilitate a slow transition between the first pitch state and the second pitch state.

7. The system of claim 1, wherein the spring force of the spring is selected to provide a threshold angular velocity of the rotors at which the sum of the pitch torques associated with the counterweights becomes greater than the spring force to facilitate a transition from the first pitch state to the second pitch state.

8. The system of claim 1, wherein the first pitch state corresponds to a first pitch and a first angular velocity of the rotors and the second pitch state corresponds to a second pitch and a second angular velocity of the rotors, wherein the first pitch is greater than the second pitch, wherein the second angular velocity is greater than the first angular velocity.

9. A vertical takeoff and landing (VTOL) vehicle comprising the rotors and the passive rotor pitch control system of claim 8, wherein the first pitch state corresponds to horizontal flight of the VTOL vehicle via the rotors, wherein the second pitch state corresponds to takeoff, landing, and hover conditions of the VTOL vehicle via the rotors.

10. A method for operating a vertical takeoff and landing (VTOL) vehicle comprising a rotor assembly that includes a passive rotor pitch control system, the method comprising:
activating the rotor assembly to rotate to provide a pitch torque about a pitch axis associated with each of a plurality of rotors of the rotor assembly;
converting a sum of the pitch torques about each of the pitch axes into an axial force on a pitch rod via a scotch yoke mechanism coupled to the pitch rod;
increasing an angular velocity of rotation of the rotor assembly beyond a threshold angular velocity to increase the axial force greater than a spring force acting opposite the axial force on the pitch rod to rotate a pitch of each of the rotors from a first pitch state to a second pitch state via a pitch change assembly to provide lift of the VTOL vehicle for takeoff via the rotors; and
decreasing the angular velocity of rotation of the rotor assembly less than the threshold angular velocity to decrease the axial force less than the spring force on the pitch rod to rotate the pitch of each of the rotors from the second pitch state to the first pitch state via the pitch change assembly to provide horizontal flight of the VTOL vehicle via the rotors.

11. The method of claim 10, wherein activating the rotors to rotate to provide the pitch torque comprises activating the rotors to rotate to provide the pitch torque via a plurality of counterweights that are each associated with a respective one of the rotors, each of the counterweights having a center of mass that provides the pitch torque about the pitch axis in response to rotation of the rotors about a rotation axis.

12. The method of claim 10, further comprising providing a slow transition between the first and second pitch states based on providing flow-through of a viscous fluid through a through-hole coupled to the pitch rod in a chamber comprising the pitch rod and a spring configured to provide the spring force.

13. The method of claim 10, further comprising increasing the angular velocity of rotation of the rotor assembly beyond the threshold angular velocity to increase the axial force greater than the spring force acting opposite the axial force on the pitch rod to rotate the pitch of each of the rotors from the first pitch state to the second pitch state via the pitch change assembly to provide lift of the VTOL vehicle for landing via the rotors.

14. A rotor assembly system comprising:
a set of rotors that are configured to rotate at an angular velocity to provide thrust; and
a passive rotor pitch control system, the passive rotor pitch control system comprising:
a plurality of counterweights, each of the counterweights being associated with one of a respective plurality of rotors and being arranged to have a center of mass configured to provide a pitch torque about a pitch axis associated with the respective one of the rotors in response to rotation of the rotors about a rotation axis;
a spring forcer comprising a pitch rod and a spring configured to provide a spring force on the pitch rod; and
a pitch change assembly comprising a scotch yoke mechanism coupled to the counterweights and the pitch rod, wherein a sum of the pitch torques provided by the counterweights is provided on the scotch yoke mechanism to provide an axial force on the pitch rod opposite the spring force, the pitch change assembly being configured to rotate a pitch of each of the rotors from a first pitch state to a second pitch state in response to the angular velocity being greater than a threshold angular velocity at which the axial force becomes greater than the spring force.

15. The system of claim 14, wherein the counterweights comprise a pair of counterweights associated with a respective pair of rotors, wherein the pitch rod is arranged along a first axis corresponding to the rotation axis about which the rotors rotate and along which the spring force is provided, wherein the scotch yoke mechanism comprises:
a yoke coupled to the pitch rod, the yoke comprising a planar yoke surface arranged orthogonal with respect to the first axis;
a slider block that is associated with one of the rotors and configured to slide against and push on the planar yoke surface; and
a slider pin coupled to one of the rotors and extending through the slider block along an axis parallel to the pitch axis, such that, in response to the sum of the pitch torques associated with the counterweights being greater than the spring force, the slider pin rotates about the pitch axis to slide the slider pin along the planar yoke surface to provide the axial force on the planar yoke surface along the first axis opposite the spring force.

16. The system of claim 14, wherein the counterweights comprise a set of counterweights associated with a respective set of rotors greater than two, wherein the scotch yoke mechanism comprises:
a yoke coupled to the pitch rod, the yoke comprising a housing enclosing the pitch rod and further comprising a first rotating joint arranged exterior to the housing; and
a pitch arm coupled at a first end to the first rotating joint and coupled at a second end to one of the counterweights via a second rotating joint, wherein the pitch torque provided by the respective one of the counterweights is provided along the pitch arm via the second rotating joint, such that the pitch arm provides a component of the axial force on the pitch rod opposite the spring force via the first rotating joint on the housing.

17. The system of claim 14, wherein the spring forcer further comprises:
- a forcer housing enclosing the spring and at least a portion of pitch rod and being filled with a viscous fluid; and
- a dividing disk formed integral with and about the pitch rod, the dividing disk dividing an interior of the forcer housing into a first portion and a second portion, the dividing disk comprising at least one through-hole to provide flow-through of the viscous fluid to facilitate a slow transition between the first pitch state and the second pitch state.

18. The system of claim 14, wherein the first pitch state corresponds to a first pitch and a first angular velocity of the rotors and the second pitch state corresponds to a second pitch and a second angular velocity of the rotors, wherein the first pitch is greater than the second pitch, wherein the second angular velocity is greater than the first angular velocity.

\* \* \* \* \*